United States Patent [19]

Iwakuni et al.

[11] Patent Number: 5,489,561

[45] Date of Patent: Feb. 6, 1996

[54] CATALYST FOR EXHAUST GAS PURIFICATION

[75] Inventors: Hideharu Iwakuni; Akihide Takami, both of Hiroshima; Takashi Takemoto, Higashihiroshima; Tadashi Isobe, Hiroshima; Yasuto Watanabe, Iwakuni, all of Japan

[73] Assignee: Mazda Motor Corporation, Hiroshima, Japan

[21] Appl. No.: 186,928

[22] Filed: Jan. 27, 1994

[30] Foreign Application Priority Data

Feb. 2, 1993 [JP] Japan .................................. 5-015278

[51] Int. Cl.$^6$ ................................................. B01J 29/06
[52] U.S. Cl. ............................................ 502/66; 423/239.2
[58] Field of Search .............................. 423/239.2; 502/66

[56]  References Cited

FOREIGN PATENT DOCUMENTS

| | | |
|---|---|---|
| 0410440 | 1/1991 | European Pat. Off. ............. 423/239.2 |
| 0485180 | 5/1992 | European Pat. Off. ................... 502/66 |
| 3197522 | 8/1988 | Japan .................................. 423/239.2 |
| 1135540 | 5/1989 | Japan ....................................... 502/66 |
| 3-89942 | 4/1991 | Japan . |

Primary Examiner—Asok Pal
Attorney, Agent, or Firm—Fish & Richardson

[57] ABSTRACT

An exhaust gas purifying catalyst includes a metal-containing silicate and a noble metal active species carried by the metal-containing silicate. The metal-containing silicate has a solid acid characteristic wherein the amount of acid within a region where an acidity function Ho is equal to or smaller than −3.0 ranges from 0.04 to 0.55 mmol/gr. The noble metal active species burns an hydrocarbon component of exhaust gases to decompose an NOx component also contained in the exhaust gases. The catalyst may include a binder for carrying the noble metal active species on the metal-containing silicate. The binder has a solid acid characteristic wherein the amount of acid within a region where the acidity function Ho is equal to or smaller than −3.0 ranges from 0.04 to 0.55 mmol/gr.

6 Claims, 1 Drawing Sheet

Fig. 1

CATALYST FOR EXHAUST GAS PURIFICATION

BACKGROUND OF THE INVENTION

1. Field of the Invention

The present invention relates to a catalyst for exhaust gas purification.

2. Description of Related Art

As a catalyst for use in purifying exhaust gases from an internal combustion engine, a three-way catalyst has long been well known in the art. The three-way catalyst is able to simultaneously oxidize CO (carbon monoxide) and HC (hydrocarbons) and reduce NOx (nitrogen oxides). This three-way catalyst generally comprises γ-alumina deposited with platinum (Pt), palladium (Pd) and the like and is known to exhibit a relatively high purifying efficiency with exhaust gases which have resulted from burning of an air-fuel mixture of about 14.7 in stoichiometric air-to-fuel ratio.

Of various noxious compositions contained in exhaust gases, NOx is generally considered to have an offensive impact on human bodies and environmental ecology. The general notion is that NOx emission to the atmosphere should be minimized. Numerous methods have been proposed to minimize NOx emission, and so long as automobile engines are concerned, the use of a catalytic converter on an engine exhaust system is widespread.

On the other hand, in the field of automobiles, a diluted combustion engine, that is, an engine operable with a leaned fuel, has been employed to meet regulations imposed on the fuel consumption. However, since the diluted combustion engine generally makes use of the air-fuel mixture of an air-to-fuel ratio higher than the stoichiometric ratio, the exhaust gases emitted from the diluted combustion engine are oxygen-enriched and, therefore, the three-way catalyst referred to above cannot satisfactorily reduce NOx even though it works well with CO and HC.

As a catalyst effective to decompose NOx, contained in the exhaust gases, into $N_2$ and $O_2$ directly or in the presence of a reducing agent (such as, for example, CO and/or HC) even under the oxygen-enriched atmosphere, a catalyst comprising a zeolite supporting a transition metal such as, for example, Cu by means of an ion exchanger is nowadays considered promising.

In order for the ion-exchange zeolite catalyst to exhibit a satisfactory NOx purification with respect to varying compositions of exhaust gases, studies have been extensively made on the composition of zeolite and active species carried by the zeolite carrier.

By way of example, Japanese Laid-open Patent Publication (examined) No. 3-89942 discloses a technique in which at least one rare earth element is carried by the zeolite together with Cu to allow the resultant zeolite catalyst to have moderate acid sites or acid centers. This prior art technique is intended to transform low-reactive paraffin hydrocarbons in the HC composition into high-reactive olefin hydrocarbons in the presence of the acid sites to thereby increase the activity with which NOx is decomposed.

However, the Cu-ion exchange zeolite catalyst generally considered useful to remove the NOx component effectively from the exhaust fails to exhibit satisfactory NOx purification under certain circumstances. More specifically, although the catalyst of the type referred to above generally exhibits a factor of 80% NOx purification under laboratory tests, the NOx purification factor tends to be lowered, when it is used in practice to remove the NOx component from the oxygen-enriched exhaust gases emitted from the diluted combustion engine, due to variation in characteristic of the exhaust gases.

Furthermore, in actual automotive vehicles, the exhaust gases occasionally come to have a high temperature close to 800° to 900° C. In the zeolite catalyst, such a high temperature has been confirmed to cause sintering of the transition metal employed as the active species, or to cause a structural change of, for example, removing Al contained in the zeolite from a crystal lattice, thereby lowering or eventually losing the activity of the zeolite catalyst.

On the other hand, under an automobile steering condition in which an automotive vehicle equipped with a diluted combustion engine, that is an internal combustion engine operable with an oxygen-enriched fuel, is repeatedly started and stopped, the temperature of exhaust gases emerging from such engine as measured at the inlet to the catalytic converter is low and, therefore, it has been desired to provide a catalyst having a sufficient resistance to the elevated temperature and also capable of exhibiting an increased exhaust purifying capacity at low temperatures.

In view of the foregoing, the inventors of the present invention have developed an NOx purifying catalyst wherein as active species to be carried by a metal-containing silicate such as, for example, zeolite, a noble metal including Pt and Ir is employed so that the resultant catalyst can have a high activity in the low temperature region. The inventors of the present invention have found that addition of Rh to the noble metal results in an increase of resistance of the NOx purifying catalyst to the elevated temperature.

In general, the NOx purifying catalyst is known to be of such a characteristic that, if a carrier matrix is made of zeolite, the purifying activity of the catalyst is high when the silica/alumina ratio is small, but lattice destruction takes place at a high temperature region accompanied by a reduction in activity and, therefore, optimum conditions can be found between the activity and the temperature of the exhaust gases at the inlet to the catalyst converter. On the other hand, if the silica/alumina ratio is relatively large, purifying activity tends to be is lowered while heat resistance increases, rendering it difficult for the catalyst to have both a satisfactory purifying activity and a satisfactory heat resistance.

Also, since at the high temperature region the activity and the degradation are affected by the temperature of the exhaust gases at the inlet to the catalytic converter and the atmosphere of the exhaust gases, it is often observed that the degradation of the zeolite used as the carrier matrix does not match with the degradation of the noble metal active species.

Accordingly, in order for the catalyst to satisfy two incompatible requirements to exhibit an excellent NOx purifying characteristic particularly at the low temperature region and to have an increased resistance to the elevated temperature, it appears that the metal-containing silicate such as zeolite should have a function of enhancing an initial activity of the catalyst and also a characteristic sufficient to increase the heat resistance.

SUMMARY OF THE INVENTION

The present invention is, therefore, aimed at providing the metal-containing silicate with the above described function and characteristic so that the catalyst comprising the noble metal active species carried by the metal-containing silicate may have both an increased NOx purifying characteristic under an oxygen-enriched atmosphere and an increased heat resistance.

For this purpose, the inventors of the present invention have conducted research in an attempt to strengthen and improve the characteristic of the metal-containing silicate.

During the course of research, the metal-containing silicate catalyst comprising the noble metal active species such as Pt—Ir capable of exhibiting a high activity at a low temperature region has been examined to determine the behavior of the metal-containing silicate, used as the carrier matrix, in association with the Pt—Ir active species to exhibit a catalytic function.

As a result of the examination, it has been confirmed that the NOx purifying activity of the above described catalyst is produced as a result of activation of hydrocarbons (HC) in the presence of active sites of the metal-containing silicate, that the activation of the hydrocarbons is associated with the solid acid characteristic of the metal-containing silicate, and that control of the solid acid characteristic will enhance the activation of the hydrocarbons. It has also been confirmed that the solid acid characteristic is governed by the amount of acid in a required acidity functional area and that the amount of acid in turn governs the number and the strength of acid sites or acid centers.

In other words, the inventors of the present invention have found that the control of the solid acid characteristic of the metal-containing silicate makes it possible to secure the amount of acid within the required acidity functional area and, since the hydrocarbon component contained in the exhaust gases can be formed into hydrocarbon radicals in the presence of the acid sites so formed, the hydrocarbon component comes to have a characteristic effective to attack the NOx component also contained in the exhaust gases. In this way, the NOx purifying factor can be increased. The inventors of the present invention have also found that the control of the solid acid characteristic is effective to render the metal-containing silicate to have a favorable heat resistance. Thus, the catalyst can have both the satisfactory purifying function and the satisfactory heat resistance.

The present invention is based on the above discussed finding. Thus, in one aspect of the present invention, the solid acid characteristic of the metal-containing silicate is controlled to form acid sites where partial oxidization of the HC component takes place easily, thereby facilitating formation of the HC into radicals and, also, the NOx component can be effectively decomposed under the oxygen-enriched atmosphere by the attack of the HC which has been activated by the active species.

In accomplishing the above and other objectives, there is provided an exhaust gas purifying catalyst comprising a metal-containing silicate and a noble metal active species carried by the metal-containing silicate for burning a hydrocarbon component of exhaust gases to decompose an NOx component also contained in the exhaust gases. The metal-containing silicate has such a solid acid characteristic wherein the amount of acid within a region where the acidity function Ho is equal to or smaller than −3.0 is within the range of 0.04 to 0.55 mmol/gr.

According to another aspect of the present invention, along with the use of the metal-containing silicate of a nature effective to facilitate activation of the HC, the amount of aluminum (Al) which would affect the amount of acid in the metal-containing silicate is maintained at a predetermined value for the purpose of avoiding any possible reduction in activity of the catalyst to purify the NOx component and, also, the amount of sodium (Na) is controlled for the purpose of avoiding any possible reduction in strength of the individual acid sites which would otherwise result from the presence of an excessive quantity of Na. For this purpose, the metal-containing silicate used in the exhaust gas purifying catalyst is in the form of aluminosilicate of a kind containing aluminum within the range of 0.4 to 1.8 wt % and sodium within the range of 0.01 to 0.05 wt % and having the acid amount within the range of 0.05 to 0.43 mmol/gr.

If the noble metal active species employed in the exhaust gas purifying catalyst of the present invention is chosen to be platinum (Pt), formation of the radicals of HC excited at the acid sites of the metal-containing silicate can advantageously be further enhanced.

Alternatively, if the noble metal active species in the exhaust gas purifying catalyst is chosen to be a noble metal including platinum (Pt) and iridium (Ir), formation of the radicals of HC excited at the acid sites of the metal-containing silicate is enhanced by the presence of Pt and the NOx component adsorbed by Ir can efficiently be decomposed by the attack of the HC radicals.

Preferably, the exhaust gas purifying catalyst also comprises a binder. The use of the binder is effective to form the acid sites at which HC can be excited by controlling acid characteristics of the binder to thereby permit inter-particles of the metal-containing silicate and their surfaces to be controlled according to the required solid acid characteristic.

Where the binder is employed, the binder is preferably of a kind having a solid acid characteristic wherein the amount of acid within a region where the acidity function Ho is equal to or smaller than −3.0 is within the range of 0.04 to 0.55 mmol/gr.

Also preferably, where the binder is employed in the exhaust gas purifying catalyst as described above, the metal-containing silicate employed in the exhaust gas purifying catalyst of the present invention has a solid acid characteristic wherein the amount of acid within a region where the acidity function Ho is equal to or smaller than −3.0 is within the range of 0.04 to 0.55 mmol/gr. The employment of the binder is effective to facilitate the formation of the acid sites, at which the HC can be excited, not only within micropores in the metal-containing silicate, but also at the surfaces of and among the particles of the metal-containing silicate.

If the acidity function Ho is greater than −3.0 (shifted to the plus side), the HC cannot be sufficiently excited, resulting in an insufficient NOx purifying characteristic and a reduced heat resistance.

If the amount of acid within the region where Ho≦−3.0 is smaller than 0.04 mmol/gr, the activity of the HC becomes insufficient to thereby reduce the NOx purifying characteristic. On the other hand, if the amount of acid exceeds 0.55 mmol/gr, when the catalyst is heated, a violent change in acid characteristic takes place which tends to reduce the heat resistance. Accordingly, the amount of acid in the range of 0.04 to 0.55 mmol/gr is preferred, and the amount of acid in the range of 0.05 to 0.43 mmol/gr is more preferred to provide the satisfactory NOx purifying characteristic and the satisfactory heat resistance.

If the metal-containing silicate contains no Al or a very small amount of Al, the NOx purifying factor becomes small. In contrast, if the metal-containing silicate contains a large amount of Al, acid produced by Al increases the amount of acid, but reduces the strength of the individual acid sites. Accordingly, the amount of Al in the range of 0 to 0.2 wt % is preferred, and the amount of Al in the range of 0.4 to 1.8 wt % is particularly preferred.

Furthermore, if the metal-containing silicate contains a large amount of Na, the strength of the individual acid sites tends to reduce. In consideration of this fact and the use of the metal-containing silicate containing Na-type cation species, the content of Na ranging from 0 to 0.3 wt % is preferable, and that ranging from 0.01 to 0.05 wt % is particularly preferable.

Various methods can be employed to control the solid acid characteristic of the metal-containing silicate, before the noble metal active species is carried thereon, so that the amount of acid may fall within the required acidity functional area referred to above. Among them, a method of blending a plurality of metal-containing silicates is particularly effective.

If the metal-containing silicate has, for example, a large silica/alumina ratio which is considered advantageous in enhancing the heat resistance, but if this ratio is too large, the number of acid sites (total amount of acid) reduces, and the burning condition of HC becomes bad. As a result, the NOx purifying factor tends to reduce.

Also, if the metal-containing silicate contains only Na-type cation species, a weak acid in the form of Lewis acid exists therein. However, if an H-type metal-containing silicate contains protons as cation species, Broensted acid, which is a strong acid, is produced in addition to the Lewis acid. Because of this, the H-type metal-containing silicate has the advantage of strengthening the acidity function and also the advantage of maintaining the amount of acid without excessively increasing the content of Al in the metal-containing silicate.

In view of the above, a metal-containing silicate mixture having a required solid acid characteristic effective to enhance the NOx purifying characteristic and the heat resistance can be obtained by blending a plurality of metal-containing silicates having different properties, i.e., a plurality of metal-containing silicates (for example, ZSM-5) having appropriately selected silica/alumina ratios or cation species (Na-type or H-type).

The blending of the plurality of metal-containing silicates has the advantage of not only improving the solid acid characteristic, but also facilitating the control of the content of Al or the content of Na in the silicate mixture.

Any other suitable method such as, for example, an Al removing method, an acid treatment method, or a partial ion-exchange method other than the above-described method is employable to obtain the metal-containing silicate mixture having the required solid acid characteristic. Furthermore, if it is possible to render a single metal-containing silicate to have the required solid acid characteristic, the metal-containing silicate can be, as a matter of course, solely used as a carrier matrix.

BRIEF DESCRIPTION OF THE DRAWING

The above and other objectives and features of the present invention will become more apparent from the following description of the present invention with reference to the sole accompanying drawing which illustrates a schematic diagram explanatory of a reaction taking place in the exhaust gas purifying catalyst according to the present invention.

When the metal-containing silicate is controlled so that the amount of acid within a region where the acidity function Ho is equal to or smaller than −3.0 is within the range of 0.04 to 0.55 mmol/gr, a large number of acid sites having a function of initiating excitation of the HC in the exhaust gases are formed on the metal-containing silicate. Because the presence of such acid sites excites the HC to cause a radical reaction, which is in turn activated by the noble metal active species, the HC strongly attacks NOx in the exhaust gases to thereby effectively decompose the NOx into $N_2$ and $O_2$ under the oxygen-enriched atmosphere.

Where Pt is carried as active species, because the radical reaction referred to above is strongly activated thereby, the HC radicals strongly attack the NOx.

Figure 1:
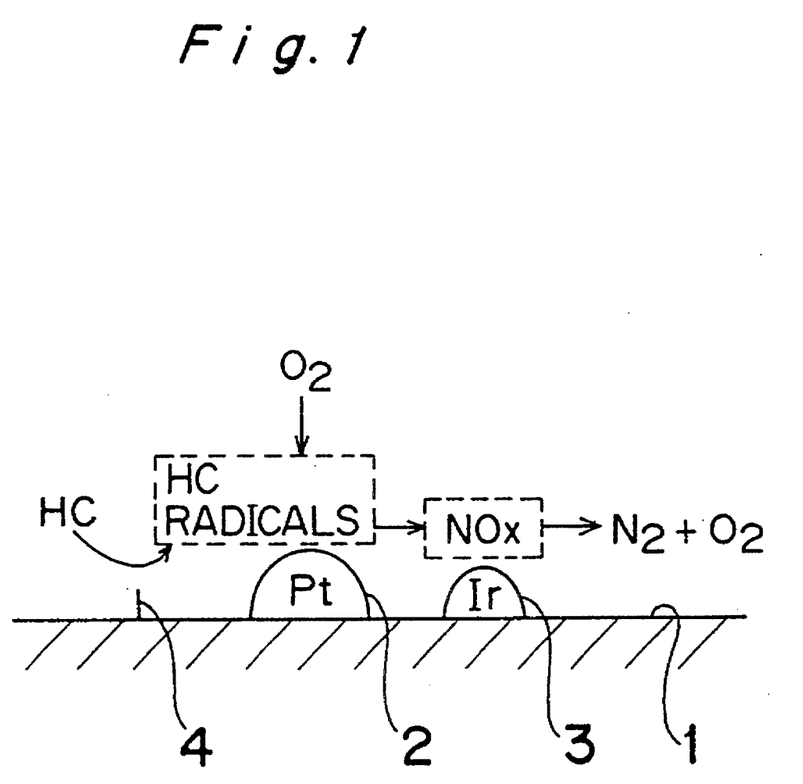

As discussed previously, Ir together with Pt may be carried as active species on, for example, aluminosilicate, as shown in FIG. 1. In FIG. 1, Pt 2 and Ir 3 each in the form of a metal are carried on aluminosilicate 1. The aluminosilicate 1 is so controlled as to have the required solid acid characteristic referred to above to thereby form acid sites 4 on the aluminosilicate 1.

The HC in the exhaust gases arriving at the catalyst first contacts the acid sites 4 at which the HC is excited and formed into HC radicals. This radical reaction is presumed to be of a mechanism analogous to the mechanism wherein the HC reacts with and is partially oxidized by $O_2$ on Pt, and is then formed into the HC radicals. Because the HC radicals so formed on the acid sites 4 are partially oxidized on Pt 2 to thereby enhance the radical reaction, the HC is activated as strongly attacking species.

On the other hand, this HC attacks NOx adsorbed on the surface of Ir 3 in the form of a metal and effectively decomposes it into $N_2$ and $O_2$ under the oxygen-enriched atmosphere.

Furthermore, because the aluminosilicate contains a required amount of Al, the production of a required amount of acid by Al is also ensured to thereby support the radical reaction of the HC.

Even if the metal-containing silicate having Na-type cation species is used, appropriate control of the content of Na can avoid a reduction in strength of individual acid sites formed on the metal-containing silicate as the carrier matrix and, hence, no reduction in NOx purifying characteristic takes place.

Also, appropriate control of the solid acid characteristic of the metal-containing silicate improves the thermal stability of the metal-containing silicate structure to thereby enhance the heat resistance of the catalyst.

Where the exhaust gas purifying catalyst includes a binder, the binder is so controlled as to have a solid acid characteristic wherein the amount of acid within a region where the acidity function Ho is equal to or smaller than −3.0 is within the range of 0.04 to 0.55 mmol/gr.

Also preferably, where the binder is employed in the exhaust gas purifying catalyst as described above, the metal-containing silicate employed in the exhaust gas purifying catalyst of the present invention has a solid acid characteristic wherein the amount of acid within a region where the acidity function Ho is equal to or smaller than −3.0 is within the range of 0.04 to 0.55 mmol/gr. Accordingly, the surfaces of and the spaces among particles of the metal-containing silicate come to have a required solid acid characteristic. As a result, acid sites are formed at locations having such required solid acid characteristic, and the HC is excited and formed into the HC radicals at the acid sites. Because this radical reaction is activated by the noble metal active species, the HC strongly attacks NOx, which is in turn effectively decomposed into $N_2$ and $O_2$ under the oxygen-enriched atmosphere.

Particularly, in applications where the binder controlled so as to have the required solid acid characteristic referred to above is added to the catalyst including the noble metal active species carried on the metal-containing silicate which has also been controlled so as to have the same solid acid characteristic as that of the binder, the required solid acid characteristic is ensured not only within micropores in the metal-containing silicate, but also at the surfaces of and among the particles of the metal-containing silicate. Accordingly, the area having such solid acid characteristic is extended and the number of acid sites to be formed is increased. These acid sites strongly excite the HC to cause a vigorous radical reaction, which is further activated by the noble metal active species. The HC radicals so activated strongly attack NOx to thereby provide a superior NOx decomposing characteristic under the oxygen-enriched atmosphere.

DETAILED DESCRIPTION OF THE PREFERRED EMBODIMENTS

Hereinafter the present invention will be described in connection with preferred embodiments thereof.

First Embodiment

A catalyst is obtained in a manner such that a noble metal active species is carried by either a single metal-containing silicate having a required solid acid characteristic, or a silicate mixture which is controlled so as to have the required solid acid characteristic by blending a plurality of metal-containing silicates having different molar ratios of silica/alumina or different types of cations (Na-type or H-type).

Catalyst Having Pt And Ir Carried Thereon As Active Species

EXAMPLE 1

An H-type metal-containing silicate (H/ZSM-5) having a molar ratio of 30 of silica/alumina and an H-type metal-containing silicate (H/ZSM-5) having a molar ratio of 200 of silica/alumina were weighed so as to be 0.15:0.85 in weight ratio, and were then sufficiently stirred and mixed together in ethanol for 1 hour. Thereafter, the resultant silicate mixture was dried at 160° C.

Then, a crystal ($Pt(NH_3)_2Cl_2$) of platinum, chlorine, and ammonia, and iridium trichloride were weighed so as to be Pt:Ir=3:1 and so that Pt and Ir might be carried in a total quantity of 3 g per 1 liter of the catalyst. These materials were then sufficiently mixed together to disperse in a solution containing ion exchange water and ethanol. Thereafter, this mixture was added with the silicate mixture above, sufficiently stirred at a room temperature, and finally solidified by vaporization. The resultant mixture was sufficiently dried at a temperature ranging from 150° C. to 200° C. to provide a catalyst comprised of the metal-containing silicate mixture carrying Pt and Ir.

The silicate catalyst was added with 20 wt % of hydrated alumina employed as a binder and was further added with an appropriate amount of water to thereby provide a slurry for use in wash-coating. Then, a honeycomb-shaped carrier made of cordierite and having 400 cells per square inch was dipped into the slurry. After an excessive amount of slurry was blown by air and the carrier was dried, the carrier was baked at 500° C. for 2 hours in the atmosphere to provide an exhaust gas purifying catalytic converter wherein the slurry was wash-coated on the honeycomb-shaped carrier so that the quantity of the catalyst might be about 30 wt % relative to the honeycomb-shaped carrier.

EXAMPLE 2

An H-type metal-containing silicate (H/ZSM-5) having a molar ratio of 144 of silica/alumina was employed in place of the H/ZSM-5 having a molar ratio of 200 of silica/alumina employed in the Example 1. The H/ZSM-5 having a molar ratio of 30 of silica/alumina and the H/ZSM-5 having a molar ratio of 144 of silica/alumina were weighed so as to be 0.35:0.65 in weight ratio, and were then sufficiently stirred and mixed together in ethanol for 1 hour. The resultant mixture was dried at 160° C. Except for the preparation of the silicate mixture, an exhaust gas purifying catalytic converter was obtained in the same manner as the Example 1.

EXAMPLE 3

An Na-type metal-containing silicate (Na/ZSM-5) having a molar ratio of 200 of silica/alumina was employed in place of the H/ZSM-5 having a molar ratio of 200 of silica/alumina employed in the Example 1. The H/ZSM-5 having a molar ratio of 30 of silica/alumina and the Na/ZSM-5 having a molar ratio of 200 of silica/alumina were weighed so as to be 0.25:0.75 in weight ratio, and were then sufficiently stirred and mixed together in ethanol for 1 hour. The resultant mixture was dried at 160° C. Except for the preparation of the silicate mixture, an exhaust gas purifying catalytic converter was obtained in the same manner as the Example 1.

EXAMPLE 4

The H/ZSM-5 having a molar ratio of 30 of silica/alumina was solely employed in place of the silicate mixture employed in the Example 1. Except for this, an exhaust gas purifying catalytic converter was obtained in the same manner as the Example 1.

EXAMPLE 5

The H/ZSM-5 having a molar ratio of 144 of silica/alumina was solely employed in place of the silicate mixture employed in the Example 1. Except for this, an exhaust gas purifying catalytic converter was obtained in the same manner as the Example 1.

EXAMPLE 6

The H/ZSM-5 having a molar ratio of 200 of silica/alumina was solely employed in place of the silicate mixture employed in the Example 1. Except for this, an exhaust gas purifying catalytic converter was obtained in the same manner as the Example 1.

Comparative Example 1

The Na/ZSM-5 having a molar ratio of 30 of silica/alumina was solely employed in place of the silicate mixture employed in the Example 1. Except for this, an exhaust gas purifying catalytic converter was obtained in the same manner as the Example 1.

Comparative Example 2

The Na/ZSM-5 having a molar ratio of 70 of silica/alumina was solely employed in place of the silicate mixture employed in the Example 1. Except for this, an exhaust gas purifying catalytic converter was obtained in the same manner as the Example 1.

Comparative Example 3

The Na/ZSM-5 having a molar ratio of 200 of silica/alumina was solely employed in place of the silicate mixture employed in the Example 1. Except for this, an exhaust gas purifying catalytic converter was obtained in the same manner as the Example 1.

Catalyst Having Only Pt Carried Thereon As Active Species

EXAMPLE 7

The same silicate mixture as that of the Example 1 was prepared.

Then, a crystal ($Pt(NH_3)_2Cl_2$) of platinum, chlorine, and ammonia was weighed so that Pt might be carried in a total quantity of 3 g per 1 liter of the catalyst. This material was then dissolved in ion exchange water, which was then added with the silicate mixture above, sufficiently stirred at a room temperature, and finally solidified by vaporization. The resultant mixture was sufficiently dried at a temperature ranging from 150° C. to 200° C. to provide a catalyst comprised of the metal-containing silicate mixture carrying Pt.

The silicate catalyst carrying Pt was added with 20 wt % of hydrated alumina employed as a binder and was further added with an appropriate amount of water to thereby provide a slurry for use in wash-coating. Using this slurry, an exhaust gas purifying catalytic converter was obtained in the same manner as the Example 1.

EXAMPLE 8

The H/ZSM-5 having a molar ratio of 144 of silica/alumina was employed in place of the H/ZSM-5 having a molar ratio of 200 of silica/alumina employed in the Example 1. The H/ZSM-5 having a molar ratio of 30 of silica/alumina and the H/ZSM-5 having a molar ratio of 144 of silica/alumina were weighed so as to be 0.35:0.65 in weight ratio, and were then sufficiently stirred and mixed together in ethanol for 1 hour. The resultant mixture was dried at 160° C. Except for the preparation of the silicate mixture, an exhaust gas purifying catalytic converter was obtained in the same manner as the Example 7.

EXAMPLE 9

The Na/ZSM-5 having a molar ratio of 200 of silica/alumina was employed in place of the H/ZSM-5 having a molar ratio of 200 of silica/alumina employed in the Example 1. The H/ZSM-5 having a molar ratio of 30 of silica/alumina and the Na/ZSM-5 having a molar ratio of 200 of silica/alumina were weighed so as to be 0.25:0.75 in weight ratio, and were then sufficiently stirred and mixed together in ethanol for 1 hour. The resultant mixture was dried at 160° C. Except for the preparation of the silicate mixture, an exhaust gas purifying catalytic converter was obtained in the same manner as the Example 7.

EXAMPLE 10

Except for the sole use of the H/ZSM-5 having a molar ratio of 30 of silica/alumina as the metal-containing silicate, an exhaust gas purifying catalytic converter was obtained in the same manner as the Example 7.

EXAMPLE 11

Except for the sole use of the H/ZSM-5 having a molar ratio of 144 of silica/alumina as the metal-containing silicate, an exhaust gas purifying catalytic converter was obtained in the same manner as the Example 7.

EXAMPLE 12

Except for the sole use of the H/ZSM-5 having a molar ratio of 200 of silica/alumina as the metal-containing silicate, an exhaust gas purifying catalytic converter was obtained in the same manner as the Example 7.

Comparative Example 4

Except for the sole use of the Na/ZSM-5 having a molar ratio of 30 of silica/alumina as the metal-containing silicate, an exhaust gas purifying catalytic converter was obtained in the same manner as the Example 7.

Comparative Example 5

Except for the sole use of the Na/ZSM-5 having a molar ratio of 70 of silica/alumina as the metal-containing silicate, an exhaust gas purifying catalytic converter was obtained in the same manner as the Example 7.

Comparative Example 6

Except for the sole use of the Na/ZSM-5 having a molar ratio of 200 of silica/alumina as the metal-containing silicate, an exhaust gas purifying catalytic converter was obtained in the same manner as the Example 7.

Catalyst Having Matrix Of Metal-Containing Silicate Other Than Zeolite

EXAMPLE 13

Proton ion-exchange Mn-containing aluminosilicate ($H^+$–Si/(Al+Mn)) having Si/Al=50 and Si/Mn=9000 was employed as a matrix carrying active species. After Pt and Ir were carried on this metal-containing silicate, the Mn-containing H-type aluminosilicate catalyst carrying Pt and Ir was prepared in the same manner as the Example 1, and was wash-coated on a honeycomb-shaped carrier to thereby provide an exhaust gas purifying catalytic converter.

EXAMPLE 14

Proton ion-exchange Mn-containing aluminosilicate ($H^+$–Si/(Al+Mn)) having Si/Al=70 and Si/Mn=9000 was employed as a matrix carrying active species. After Pt and Ir were carried on this metal-containing silicate, the Mn-containing H-type aluminosilicate catalyst carrying Pt and Ir was prepared in the same manner as the Example 1, and was wash-coated on a honeycomb-shaped carrier to thereby provide an exhaust gas purifying catalytic converter.

EXAMPLE 15

Proton ion-exchange Mn-containing aluminosilicate ($H^+$–Si/(Al+Mn)) having Si/Al=100 and Si/Mn=9000 was employed as a matrix carrying active species. After Pt and Ir were carried on this metal-containing silicate, the Mn-containing H-type aluminosilicate catalyst carrying Pt and Ir was prepared in the same manner as the Example 1, and was wash-coated on a honeycomb-shaped carrier to thereby provide an exhaust gas purifying catalytic converter.

Measurement Of Solid Acid Characteristic Of Matrix Of

Each Catalyst

The solid acid characteristic indicated by an acidity function and the amount of acid, the content of Al, and the content of Na were measured with respect to the silicate mixtures and the single silicate prepared in the Examples 1 to 6 (Examples 7 to 12) and the Comparative Examples 1 to 3 (Comparative Examples 4 to 6). Table 1 indicates the result of such measurements.

Also, the solid acid characteristic, the content of Al, and the content of Na were measured with respect to the Mn-containing H-type aluminosilicates prepared in the Examples 13 to 15. Table 2 indicates the result of such measurements.

The measurement of the solid acid characteristic was carried out by a method wherein the acidity function and the amount of acid were measured by the use of a Hammett indicator, i.e., the so-called Johnson method, whereas the content of Al and that of Na were measured by composition analysis.

TABLE 1

|  | Max. Acid Strength (Ho-value) | Amount of Acid (mmol/g) | Al-content (wt %) | Na-content (wt %) |
|---|---|---|---|---|
| Ex. | | | | |
| 1 & 7 | −5.6 < Ho ≦ −3.0 | 0.198 | 0.77 | 0.05 |
| 2 & 8 | " | 0.423 | 1.80 | 0.05 |
| 3 & 9 | " | 0.053 | 1.03 | 0.23 |
| 4 & 10 | " | 0.212 | 2.87 | 0.23 |
| 5 & 11 | " | 0.536 | 0.60 | 0.01 |
| 6 & 12 | " | 0.195 | 0.40 | 0.03 |
| Compar. | | | | |
| 1 & 4 | −3.0 < Ho ≦ +1.5 | 0.018 | 1.00 | 0.70 |
| 2 & 5 | " | 0.031 | 0.58 | 0.40 |
| 3 & 6 | " | 0.013 | 0.37 | 0.27 |

TABLE 2

|  | Max. Acid Strength (Ho-value) | Amount of Acid (mmol/g) | Al-content (wt %) | Na-content (wt %) |
|---|---|---|---|---|
| Ex. | | | | |
| 13 | −5.6 < Ho ≦ −3.0 | 0.384 | 1.25 | 0.02 |
| 14 | " | 0.337 | 0.62 | 0.03 |
| 15 | " | 0.216 | 0.27 | 0.02 |

Measurement Of NOx Purification Factor Of Catalytic Converter

The maximum NOx purification factors were measured when the catalytic converters of the Examples 1 to 15 and those of the Comparative Examples 1 to 6 were used as fresh, and when they were heated in the atmosphere. The deterioration ratios of the maximum NOx purification factors after the heating were also measured, relative to the maximum NOx purification factors measured when the catalytic converters were used as fresh.

The measurements above were carried out by the use of an atmospheric fixed-bed reaction apparatus in which a model gas corresponding to the exhaust gas resulting from burning of a leaned fuel at an air-to-fuel ratio of 22 was employed. The composition of the model gas used was: NOx; 2000 ppm, HC; 5500 ppmC, $O_2$; 8%, $H_2$; 650 ppm, CO; 0.2%, $CO_2$; 10%, and $N_2$; the balance. The volume velocity was so chosen as to be SV=55,000 $h^{-1}$.

The NOx purification factors, when the catalytic converters were used as fresh, were first measured, and after the catalysts accommodated therein were heated at 800° C. for 8 hours in the atmosphere, the NOx purification factors were also measured. Table 3 indicates the result of such measurements carried out with respect to the Examples 1 to 15 and the Comparative Examples 1 to 6.

TABLE 3

|  | Max. NOx Puri. Fac. (%) | | Deterioration |
|---|---|---|---|
|  | As fresh | Heated | Factor (%) |
| Example | | | |
| 1 | 60.4 | 39.1 | 35.3 |
| 2 | 50.4 | 24.7 | 51.3 |
| 3 | 43.0 | 23.3 | 45.8 |
| 4 | 47.9 | 22.3 | 53.4 |
| 5 | 61.2 | 22.4 | 63.4 |
| 6 | 35.7 | 31.4 | 12.0 |
| 7 | 42.4 | 23.6 | 44.3 |
| 8 | 40.3 | 20.5 | 49.1 |
| 9 | 37.1 | 20.4 | 45.0 |
| 10 | 24.4 | 16.9 | 30.7 |
| 11 | 40.3 | 20.1 | 50.1 |
| 12 | 21.8 | 18.3 | 16.1 |
| 13 | 58.4 | 42.4 | 26.9 |
| 14 | 60.4 | 45.6 | 24.5 |
| 15 | 45.7 | 38.2 | 16.4 |
| Compar. Ex | | | |
| 1 | 53.3 | 16.5 | 69.0 |
| 2 | 42.2 | 21.7 | 48.6 |
| 3 | 33.0 | 25.3 | 23.3 |
| 4 | 26.8 | 15.2 | 43.3 |
| 5 | 23.4 | 17.1 | 26.9 |
| 6 | 20.2 | 17.7 | 12.4 |

Evaluation Of NOx Purification Activity

Based upon the result of measurements of the solid acid characteristic, the content of Al, and the content of Na indicated in Tables 1 and 2, and the result of measurements of the NOx purification factors and the deterioration factors indicated in Table 3, the NOx purification characteristic and the heat resistance of the catalytic converters of the Examples 1 to 15 and the Comparative Examples 1 to 6 were evaluated. As a result of evaluation, almost all of the catalytic converters of the Examples 1 to 15 have a high activity when used as fresh, and exhibit an effective NOx purification characteristic even after the heating.

Of these catalytic converters, those, in which the noble metal active species is carried on the silicate mixture controlled so as to have the required solid acid characteristic by appropriately blending a plurality of metal-containing silicates having different properties, or the metal-containing silicate having the required solid acid characteristic by the inclusion of a specific metal or metals in addition to Al as a metal forming a skeleton for the metal-containing silicate, exhibit an excellent NOx purification characteristic and an enhanced heat resistance.

In particular, in applications where the silicate having the required solid acid characteristic and containing Al in the range of 0.4 to 1.8 wt % and Na in the range of 0.01 to 0.05 wt % are employed, or in applications where a noble metal including Pt and Ir is carried, as active species, on the metal-containing silicate having the required solid acid characteristic, both the purification characteristic and the heat resistance are considerably improved.

Second Embodiment

According to the second embodiment of the present invention, when a catalyst having a noble metal active species carried on a metal-containing silicate is wash-coated on a catalyst carrier by the use of a binder, acid sites where HC is excited are formed on the catalyst by controlling the acid characteristic of the binder, to thereby enhance the NOx purification factor.

Catalyst Carrying A Noble Metal Including Pt And Ir

EXAMPLE 16

A crystal ($Pt(NH_3)_2Cl_2$) of platinum, chlorine, and ammonia, and iridium trichloride were weighed so as to be Pt:Ir=3:1 and so that Pt and Ir might be carried in a total quantity of 6 g per 1 liter of the catalyst. These materials were then sufficiently mixed together to disperse in a solution containing ion exchange water and ethanol. Thereafter, this mixture was added with an H-type metal-containing silicate (H/ZSM-5) having a molar ratio of 144 of silica/alumina as a matrix for carrying the active species, and was solidified by vaporization to thereby provide a metal-containing silicate catalyst carrying Pt and Ir.

This metal-containing silicate catalyst was added with a binder comprised of hydrated alumina and silica sol in a quantity of about 20 wt %, and was then added with an appropriate amount of water to thereby provide a slurry for use in wash-coating. The slurry was wash-coated on a honeycomb-shaped carrier made of cordierite to provide an exhaust gas purifying catalytic converter.

In preparing the slurry above, it is conventionally known that the addition of an alumina-containing binder (hydrated alumina) shifts the PH of the slurry after the mixing to the acid side, whereas the addition of a silica-containing binder (silica sol) shifts the PH of the slurry to the alkaline side.

In this Example 16, the slurry was prepared by the use of a binder mixture comprised of the alumina-containing binder and the silica-containing binder mixed together at a weight ratio of 2:1.

As a result, the PH of the slurry having the metal-containing silicate on which Pt and Ir were carried and to which the binder mixture was added was 5.3 substantially equal to a PH of 5.2 of the catalyst itself (the PH of a solution at the time the catalyst was added to the ion exchange water before the addition of the binder).

EXAMPLE 17

A crystal ($Pt(NH_3)_2Cl_2$) of platinum, chlorine, and ammonia, and iridium trichloride were weighed so as to be Pt:Ir=3:1 and so that Pt and Ir might be carried in a total quantity of 3 g per 1 liter of the catalyst. These materials were then sufficiently mixed together to disperse in a solution containing ion exchange water and ethanol. Thereafter, this mixture was added with an Na-type metal-containing silicate (Na/ZSM-5) having a molar ratio of 30 of silica/alumina as a matrix for carrying the active species, and was solidified by vaporization to thereby provide a metal-containing silicate catalyst carrying Pt and Ir.

On the other hand, a binder mixture was prepared which was comprised of an alumina-containing binder and a silica-containing binder mixed together at a weight ratio of 5:3.

This binder mixture was mixed with the metal-containing silicate catalyst above and was added with an appropriate amount of water to provide a slurry for use in wash-coating. Thereafter, an exhaust gas purifying catalytic converter was obtained in the same manner as the Example 16.

The slurry in this Example 17 had a PH of 5.8 substantially equal to that of the catalyst itself.

EXAMPLE 18

A crystal ($Pt(NH_3)_2Cl_2$) of platinum, chlorine, and ammonia, iridium trichloride, and rhodium nitrate were weighed so as to be Pt:Ir:Rh=30:10:1 and so that Pt, Ir, and Rh might be carried in a total quantity of 6 g per 1 liter of the catalyst. These materials were then sufficiently mixed together to disperse in a solution containing ion exchange water and ethanol. Thereafter, this mixture was added with an H-type metal-containing silicate (H/ZSM-5) having a molar ratio of 144 of silica/alumina as a matrix for carrying the active species, and was solidified by vaporization to thereby provide a metal-containing silicate catalyst carrying Pt, Ir, and Rh.

On the other hand, a binder mixture was prepared which was comprised of an alumina-containing binder and a silica-containing binder mixed together at a weight ratio of 1:1.

This binder mixture was mixed with the metal-containing silicate catalyst above and was added with an appropriate amount of water to provide a slurry for use in wash-coating. Thereafter, an exhaust gas purifying catalytic converter was obtained in the same manner as the Example 16.

The slurry in this Example 18 had a PH of 4.6 substantially equal to that of the catalyst itself.

Comparative Example 7

Only an alumina-containing binder (hydrated alumina) was employed as the binder. Except for this, an exhaust gas purifying catalytic converter was obtained in the same manner as the Example 16.

The PH of the slurry in this Comparative Example 7 was 4.0.

Comparative Example 8

Only a silica-containing binder (silica sol) was employed as the binder. Except for this, an exhaust gas purifying catalytic converter was obtained in the same manner as the Example 16.

The PH of the slurry in this Comparative Example 8 was 6.4.

Comparative Example 9

Only an alumina-containing binder was employed as the binder. Except for this, an exhaust gas purifying catalytic converter was obtained in the same manner as the Example 17.

The PH of the slurry in this Comparative Example 9 was 4.2.

Comparative Example 10

Only a silica-containing binder was employed as the binder. Except for this, an exhaust gas purifying catalytic converter was obtained in the same manner as the Example 17.

The PH of the slurry in this Comparative Example 10 was 6.7.

Comparative Example 11

Only an alumina-containing binder was employed as the binder. Except for this, an exhaust gas purifying catalytic converter was obtained in the same manner as the Example 18.

The PH of the slurry in this Comparative Example 11 was 4.0.

Comparative Example 12

Only a silica-containing binder was employed as the binder. Except for this, an exhaust gas purifying catalytic converter was obtained in the same manner as the Example 18.

The PH of the slurry in this Comparative Example 12 was 5.1.

Evaluation Of Solid Acid Characteristic Of Binder In Catalytic Converter

In the Examples 16 to 18 and the Comparative Examples 7 to 12, the solid acid characteristic of the binder existing among particles of the metal-containing silicate as the active species-carrying matrix or on the surfaces of such particles was evaluated. This evaluation was carried out by a method wherein an acidity function and the amount of acid within the range of the acidity function were measured by the use of a Hammett indicator, i.e., the so-called Johnson method.

According to such evaluation, in the catalytic converters of the Examples 16 to 18, the solid acid characteristic of the binder added to the metal-containing silicate carrying Pt and Ir, or Pt, Ir, and Rh exhibited that the amount of acid ranged from 0.04 to 0.55 mmol/gr when the acidity function Ho was not greater than −3.0 (Ho≦−3.0).

The binder of each of the catalytic converters of the Comparative Examples 7, 9, and 11 which correspond to those of the Examples 16, 17, and 18, respectively, but indicated PH-values less than the PH-values indicated by the latter exhibited that the amount of acid exceeded 0.55 mmol/gr when Ho≦−3.0. On the other hand, the binder of each of the catalytic converters of the Comparative Examples 8, 10, and 12 which indicated PH-values greater than the PH-values indicated by those of the Examples 16, 17, and 18 exhibited that the acidity function Ho was weaker than −3.0 (shifted to the plus side), or the amount of acid was smaller than 0.04 mmol/gr when Ho≦−3.0.

Measurements Of NOx Purification Factor

With respect to the catalytic converters of the Examples 16 to 18 and those of the Comparative Examples 7 to 12, the maximum NOx purification factors were measured when the catalytic converters were used as fresh and after they were heated in the atmosphere. With respect to some of them, the temperature at which the maximum NOx purification factor was obtained was measured.

The measurements were carried out in the same manner as those of the NOx purification factors carried out with respect to the catalytic converters of the Examples 1 to 15 and those of the Comparative Examples 1 to 6.

Table 4 indicates the result of such measurements carried out with respect to the Examples 16 to 18 and the Comparative Examples 7 to 12.

TABLE 4

| | Max. NOx Puri. Fac. (%) | | | |
|---|---|---|---|---|
| | As fresh | Temp. (°C.) | Heated | Temp. (°C.) |
| Ex. | | | | |
| 16 | 65.1 | | 22.8 | |
| 17 | 65.4 | | 22.8 | |
| 18 | 50.7 | 240 | 37.2 | 265 |
| Compar. | | | | |
| 7 | 60.5 | | 19.3 | |

TABLE 4-continued

| | Max. NOx Puri. Fac. (%) | | | |
|---|---|---|---|---|
| | As fresh | Temp. (°C.) | Heated | Temp. (°C.) |
| 8 | 57.2 | | 17.7 | |
| 9 | 60.4 | | 16.5 | |
| 10 | 55.8 | | 19.9 | |
| 11 | 51.2 | 235 | 32.0 | 280 |
| 12 | 48.3 | 240 | 30.5 | 275 |

When the NOx purification factors are evaluated based upon the result of measurements indicated in Table 4, each of the catalytic converters of the Examples 16 to 18 exhibits an excellent NOx purification performance and has a high activity when used as fresh. Furthermore, because each of them maintains the practical activity even after the heating, it is clear that the heat resistance thereof is enhanced.

Third Embodiment

According to the third embodiment of the present invention, a metal-containing silicate was first obtained which was controlled so as to have an appropriate value in solid acid characteristic, and a noble metal active species was subsequently carried thereon for preparation of a catalyst. When the catalyst was wash-coated on a carrier, the solid acid characteristic of a binder was appropriately controlled to thereby not only improve the NOx purification characteristic, but also enhance the heat resistance.

EXAMPLE 19

As is the case with the Example 1, a metal-containing catalyst was prepared wherein a noble metal including Pt and Ir was carried on a silicate mixture.

On the other hand, a binder mixture was prepared which was comprised of hydrated alumina as an alumina-containing binder and silica sol as a silica-containing binder mixed together at a weight ratio of 2:1. The binder mixture was mixed in a quantity of about 20 wt % with the metal-containing silicate catalyst carrying Pt and Ir, and was then added with an appropriate amount of water to thereby provide a slurry for use in wash-coating.

The slurry thus obtained was wash-coated on a honey-comb-shaped carrier made of cordierite to provide an exhaust gas purifying catalytic converter.

The NOx purification factor of the catalytic converter of the Example 19 was evaluated when the converter was used as fresh and after it was heated. The evaluation was carried out in the same manner as the Examples 1 to 15.

As a result, the maximum NOx purification factor was 70.2% when the catalytic converter was used as fresh, and was 45.3% after it was heated. In other words, the catalytic converter of the Example 19, wherein the solid acid characteristic of the metal-containing silicate and that of the binder were both controlled to be within respective predetermined ranges, exhibited the maximum NOx purification factor higher than that of the catalytic converter of the Example 1, not only when the converter was used as fresh, but also after it was heated. Accordingly, it is clear that both the NOx purification factor and the heat resistance were enhanced.

As an alternative of the Example 19, the silicate mixture employed in the Example 1 may be replaced by one of the metal-containing silicates as employed in the Examples 2 to 15, and a noble metal including Pt may be carried, as active species, on such metal-containing silicate.

As discussed hereinabove, according to the present invention, because the metal-containing silicate is controlled so as to have an appropriate solid acid characteristic, formation of HC in the exhaust gases into HC radicals is extensively carried out, thus enhancing both the purifying performance and the heat resistance.

In particular, with the use of aluminosilicate, appropriate control of the content of Al and that of Na in the aluminosilicate makes it easy to enhance the initial activity of the silicate and prevents the NOx purifying characteristic from reducing to thereby enhance both the NOx purifying performance and the heat resistance.

Where a noble metal including Pt is employed as active species, the HC is formed into the HC radicals as strongly attacking species. Also, where a noble metal including Pt and Ir is employed, the HC radicals so formed effectively attack NOx adsorbed by Ir to thereby enhance the NOx purifying performance.

Furthermore, where the exhaust gas purifying catalyst includes a binder, appropriate control of the solid acid characteristic of the binder results in formation of acid sites at which the HC in the exhaust gases is excited. The acid sites greatly activate the radical reaction to thereby enhance both the NOx purifying performance and the heat resistance of the catalyst. Because the NOx purifying performance is enhanced by the control of the solid acid characteristic of the binder, a different characteristic of the metal-containing silicate carrying the active species can be utilized.

In applications where the binder controlled so as to have the required solid acid characteristic is added to the catalyst including the noble metal active species carried on the metal-containing silicate which has also been controlled so as to have the same solid acid characteristic as that of the binder, the area having such solid acid characteristic is extended and the number of acid sites to be formed is increased. As a result, the NOx purifying characteristic and the heat resistance can be both assuredly enhanced.

Although the present invention has been fully described by way of examples with reference to the accompanying drawing, it is to be noted here that various changes and modifications will be apparent to those skilled in the art. Therefore, unless such changes and modifications otherwise depart from the spirit and scope of the present invention, they should be construed as being included therein.

What is claimed is:

1. An exhaust gas purifying catalyst comprising:
   (a metallosilicate) having a solid acid characteristic wherein the amount of acid within a region where an acidity function Ho is equal to or smaller than −3.0 ranges from 0.04 to 0.55 mmol/gr; and
   a noble metal active species carried by said metallosilicate for burning an hydrocarbon component of exhaust gases to decompose an NOx component also contained in the exhaust gases.

2. The catalyst according to claim 1, wherein said metallosilicate comprises aluminosilicate containing aluminum ranging from 0.4 to 1.8 wt % and sodium ranging from 0.01 to 0.05 wt % and having an acid amount ranging from 0.05 to 0.43 mmol/gr.

3. The catalyst according to claim 1, wherein said noble metal active species comprises platinum.

4. The catalyst according to claim 1, wherein said noble metal active species comprises a noble metal including platinum and iridium.

5. An exhaust gas purifying catalyst comprising:
   a metallosilicate;
   a noble metal active species carried by said metallosilicate; and
   a binder for carrying said noble metal active species on said metallosilicate, said binder having a solid acid characteristic wherein the amount of acid within a region where an acidity function Ho is equal to or smaller than −3.0 ranges from 0.04 to 0.55 mmol/gr.

6. The catalyst according to claim 5, wherein said metallosilicate has a solid acid characteristic wherein the amount of acid within a region where the acidity function Ho is equal to or smaller than −3.0 ranges from 0.04 to 0.55 mmol/gr.

* * * * *